US012738739B2

(12) United States Patent
Oh

(10) Patent No.: US 12,738,739 B2
(45) Date of Patent: Sep. 15, 2026

(54) MACHINE LEARNING-BASED ENERGY MANAGEMENT SYSTEM

(71) Applicant: National Korea Maritime & Ocean University R&DB Foundation, Busan (KR)

(72) Inventor: Jin-Seok Oh, Busan (KR)

(73) Assignee: National Korea Maritime & Ocean University R&DB Foundation, Busan (KR)

( * ) Notice: Subject to any disclaimer, the term of this patent is extended or adjusted under 35 U.S.C. 154(b) by 254 days.

(21) Appl. No.: 18/793,946

(22) Filed: Aug. 5, 2024

(65) Prior Publication Data

US 2025/0079838 A1 Mar. 6, 2025

(30) Foreign Application Priority Data

Sep. 6, 2023 (KR) ........................ 10-2023-0118497

(51) Int. Cl.
*H02J 3/007* (2026.01)
*G05B 13/02* (2006.01)
*H02J 105/30* (2026.01)

(52) U.S. Cl.
CPC .......... *H02J 3/0075* (2020.01); *G05B 13/028* (2013.01); *H02J 2105/31* (2026.01)

(58) Field of Classification Search
CPC ........ H02J 3/00; H02J 3/0075; H02J 2105/31; H02J 7/1415; H02J 7/34; G05B 13/028; Y02T 90/40; Y02E 60/10; Y02E 60/50; B63J 3/04; B63J 2003/002
See application file for complete search history.

(56) References Cited

U.S. PATENT DOCUMENTS

| | | | | |
|---|---|---|---|---|
| 10,734,811 | B2 * | 8/2020 | Doherty | G05B 13/042 |
| 11,444,338 | B1 * | 9/2022 | Dhawan | H01M 50/569 |
| 2015/0188482 | A1 * | 7/2015 | Berkowitz | H02J 3/32 320/101 |
| 2021/0281077 | A1 * | 9/2021 | Cai | G05B 13/0265 |

(Continued)

FOREIGN PATENT DOCUMENTS

| | | |
|---|---|---|
| KR | 101373874 | 3/2014 |
| KR | 102359219 | 2/2022 |

(Continued)

*Primary Examiner* — Nicholas Klicos
(74) *Attorney, Agent, or Firm* — JCIPRNET

(57) ABSTRACT

Disclosed is a machine learning-based energy management system, in which a system that manages and controls a power load module and a power source module on the basis of an energy management system (EMS) that performs controlling on the basis of energy is established so that a power source is able to operate a required load under an operating condition that maximizes energy efficiency and economic efficiency, and while the EMS operates in conjunction with a load control system (LCS) inducing an overall power generation efficiency increase and energy saving while controlling the charging and discharging of a battery according to the load size value of a generator, the power supply control signal of the power source corresponding to the required load of the power load module is calculated in real time by a control signal generation EMS algorithm that performs machine learning (ML) of load data/power data.

6 Claims, 6 Drawing Sheets

Input
· Gen. power data
· Load power data
· Gen operation states
· Load states

Judgment
· Fuel cell condition
(Output power, Voltage, Current, etc)
· Battery condition
(Voltage, SOC, Current, etc)
· Load condition
(Constant, Variable, Peak, Demand, etc)
· Control method
(Gen / Load way)

Decision
· UDL
· LDL

Processing
· Control gen. power system
· Control load power system
· Decide ML method

(56) References Cited

U.S. PATENT DOCUMENTS

| | | | | |
|---|---|---|---|---|
| 2023/0182881 A1* | 6/2023 | Liu | F02D 29/06 | |
| | | | 701/21 | |
| 2025/0013215 A1* | 1/2025 | Almaleck | G05B 19/042 | |

FOREIGN PATENT DOCUMENTS

| | | |
|---|---|---|
| KR | 102424868 | 7/2022 |
| KR | 20220157578 | 11/2022 |
| KR | 20230013756 | 1/2023 |

* cited by examiner

MACHINE LEARNING-BASED ENERGY MANAGEMENT SYSTEM

CROSS REFERENCE TO RELATED APPLICATION

The present application claims priority to Korean Patent Application No. 10-2023-0118497, filed Sep. 6, 2023, the entire contents of which are incorporated herein for all purposes by this reference.

BACKGROUND OF THE INVENTION

Field of the Invention

The present disclosure relates generally to a machine learning-based energy management system which is applicable to both a large electric propulsion ship and a small electric propulsion ship. More particularly, the present disclosure relates to a machine learning-based energy management system, in which unlike a conventional power management system (PMS) that controls a propulsion load/a service electrical load (a power load module) and a power source on the basis of power, a system that manages and controls a power load module and a power source module on the basis of an energy management system (EMS) that performs controlling on the basis of energy is established so that a power source is able to operate a required load under an operating condition that maximizes energy efficiency and economic efficiency, and while the EMS operates in conjunction with a load control system (LCS) inducing an overall power generation efficiency increase and energy saving while controlling the charging and discharging of a battery according to the load size value of a generator, the power supply control signal of the power source corresponding to the required load of the power load module is calculated in real time by a control signal generation EMS algorithm that performs machine learning (ML) of load data/power data, so that the power source is optimally controlled according to the load characteristics, required load, and load change of the power load module, and output efficiency and energy saving efficiency are maximized.

Description of the Related Art

An optimal control method for the energy management of a ship varies depending on the design method of the ship, devices used therein, and passage of time, etc. The capacity and efficiency of a ship power source vary depending on the design method, and the range of use of the devices that influence each other is limited depending on the capacity. Due to the aging of the devices over time, the capacity of the devices changes again, so an initially set control algorithm does not fit an optimal design method.

Meanwhile, much research and development has been done so far in terms of power management of the entirety of a ship, but there is insufficient research on an energy management system capable of managing, on an energy basis, all of a propulsion load, a service electrical load, and the power source (a fuel cell, a battery, a generator) of a small electric propulsion ship or a large electric propulsion ship that has been actively developed and operated recently. Accordingly, demand for research for change from the function of the existing power management system to a comprehensive energy management system through the use of a battery and a fuel cell, etc. is increasing. This efficient energy management system not only improves energy use efficiency but also reduces environmental pollution by reducing exhaust gases.

Research on energy management systems for land and various studies applying neural networks are still active, but research on energy management systems for a ship applying neural networks is extremely limited. Accordingly, considering the comprehensive conditions such as the increasing demand for eco-friendly ship construction and the meeting of EEXI requirements, an efficient method for energy management systems for a ship is required to be proposed and, particularly, the improvement of the energy management system of an electric propulsion ship is urgently required.

Documents of Related Art (Patent Document 1) Korean Patent No. 10-2359219 "HYBRID ELECTRIC PROPULSION SYSTEM FOR SHIP"

(Patent Document 2) Korean Patent No. 10-1373874 "CONTROL SYSTEM FOR SHIP ELECTRIC POWER SOURCE HAVING FUEL CELL"

(Patent Document 3) Korean Patent No. 10-2424868 "FUEL CELL AND VESSEL INCLUDING SAME"

SUMMARY OF THE INVENTION

Accordingly, the present disclosure has been made to solve the above problems occurring in the related art, and the present disclosure is intended to propose a new type of machine learning-based energy management system, in which a load management control module (LCS) inducing an overall power generation efficiency increase and energy saving while controlling the charging and discharging of a battery according to the load size value of a generator operates in conjunction with an energy management control module EMS that calculates a power supply control signal based on machine learning to maximize the output efficiency and energy saving efficiency of a power source module (a fuel cell, the battery, and the generator, etc.) so as to manage and control the power load module and the power source module so that a power source is able to operate a required load under an operating condition that maximizes energy efficiency and economic efficiency.

Particularly, the present disclosure is intended to propose a new type of machine learning-based energy management system, in which the power supply control signal of the power source module corresponding to the required load of the power load module is calculated in real time by a control signal generation EMS algorithm, to which machine learning (ML) is applied, to optimally control the power source according to the load characteristics, required load, and load change of the power load module so that output efficiency and energy saving efficiency are able to be maximized.

According to a feature of the present disclosure in order to achieve the objectives of the present disclosure, there is provided a machine learning-based energy management system, the system including: a power load module 100 including a propulsion load 110 and a service electrical load 120 and configured to consume power supplied from outside; a power source module 200 including a fuel cell 210, a battery 220, and the generator 230 and configured to supply power to the power load module 100; a load management control module 300 being connected to the power source module 200 to perform status monitoring and operation control thereof, with the load management control module 300 being configured to induce an overall power generation efficiency increase and energy saving while controlling charging and discharging of the battery 220 according to a load size value of the generator 230; and an energy management control module 400 that is connected to the power load module 100 to control power supply to the propulsion load 110 and the service electrical load 120, and controls an operation of the power source module 200 in conjunction with the load management control module 300, wherein the energy management control module 400 allows a power supply control signal of the power source module 200 corresponding to a required load of the power load module 100 to be calculated in real time by a control signal generation EMS algorithm 500 to which machine learning (ML) is applied, wherein the control signal generation EMS algorithm 500 performs machine learning of load data of the power load module 100 and power data of the power source module 200, and calculates the power supply control signal to increase output efficiency and energy saving efficiency of the power source module 200 according to a load characteristic, the required load, and a load change of the power load module 100.

In the machine learning-based energy management system according to the present disclosure, the energy management control module 400 may include: a data collection unit 410 being connected to an electronic chart system (ECS) module 700, the power load module 100, and the power source module 200 to cumulatively collect initial data for machine learning comprising ship operation data, required load data, actual operation load data, and status information of the power load module 100, and supply power data and status information of the power source module 200; a valid data calculation unit 420 being connected to the data collection unit 410 to receive the initial data for machine learning, wherein the valid data calculation unit 420 calculates valid data for machine learning by extracting only initial data for machine learning that fall within a valid data range region set through a filtering algorithm 600; a machine learning execution unit 430 configured to set the control signal generation EMS algorithm 500 according to an energy-based output prediction model (EB model) that estimates a power source output to increase the output efficiency and energy saving efficiency of the power source module 200, and configured to perform machine learning of the valid data for machine learning through the control signal generation EMS algorithm 500; a power supply control signal calculation unit 440 in which the power supply control signal of the power source module 200 which is actively adjusted to the required load and load change of the power load module 100 which is currently input in real time is calculated in real time by the control signal generation EMS algorithm 500; and a power source operation control unit 450 configured to receive the power supply control signal from the power supply control signal calculation unit 440 to control the operation of the power source module 200.

In the machine learning-based energy management system according to the present disclosure, the filtering algorithm 600) of the valid data calculation unit 420 may set a numerical value region between a valid upper data limit (UDL) calculated from [Equation 1] and a valid lower data limit (LDL) calculated from [Equation 2] as the valid data range region, wherein $$UDL = m_0 + Wd\sqrt{\frac{s}{2-s}\left[1-(1-s)^{2k}\right]} \quad \text{[Equation 1]}$$

-continued $$LDL = m_0 - Wd\sqrt{\frac{s}{2-s}\left[1-(1-s)^{2k}\right]} \quad \text{[Equation 2]}$$

$m_0$: an input data average value, d: a standard deviation, W: a control width, s: a smoothing parameter.

In the machine learning-based energy management system according to the present disclosure, the machine learning execution unit 430 and the power supply control signal calculation unit 440 may perform machine learning by receiving an output value, a voltage value, and a current value of the fuel cell 210 of the power source module 200 and then may calculate the power supply control signal so that the fuel cell 210 operates at an optimal output value within a range between a minimum output value and a maximum output value.

In the machine learning-based energy management system according to the present disclosure, the machine learning execution unit 430 and the power supply control signal calculation unit 440 may perform machine learning by receiving a current value, a voltage value, and a remaining capacity value of the battery 220 of the power source module 200 and then may calculate the power supply control signal so that operation stability of the power source module 200 is increased.

In the machine learning-based energy management system according to the present disclosure, the power source module 200 may be provided with the battery 220 charged by being connected to a hydrogen fuel cell 210' and a shaft generator motor (SGM) system provided in an electric propulsion ship.

In the machine learning-based energy management system according to the present disclosure, the energy management control module 400 may operate in conjunction with a power management control module (PMS) 800 previously installed on an electric propulsion ship.

According to the present disclosure, unlike a conventional power management system (PMS) that controls a propulsion load/a service electrical load (a power load module) and a power source on the basis of power, a system that manages and controls a power load module and a power source module on the basis of an energy management system (EMS) that performs controlling on the basis of energy is provided, thereby allowing a power source to operate a required load under an operating condition that maximizes energy efficiency and economic efficiency. In addition, according to the present disclosure, while the EMS operates in conjunction with a load control system (LCS) inducing an overall power generation efficiency increase and energy saving while controlling the charging and discharging of a battery according to the load size value of a generator, the power supply control signal of the power source corresponding to the required load of the power load module is calculated in real time by a control signal generation EMS algorithm that performs machine learning (ML) of load data/power data, thereby optimally controlling the power source according to the load characteristics, required load, and load change of the power load module, and maximizing output efficiency and energy saving efficiency.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
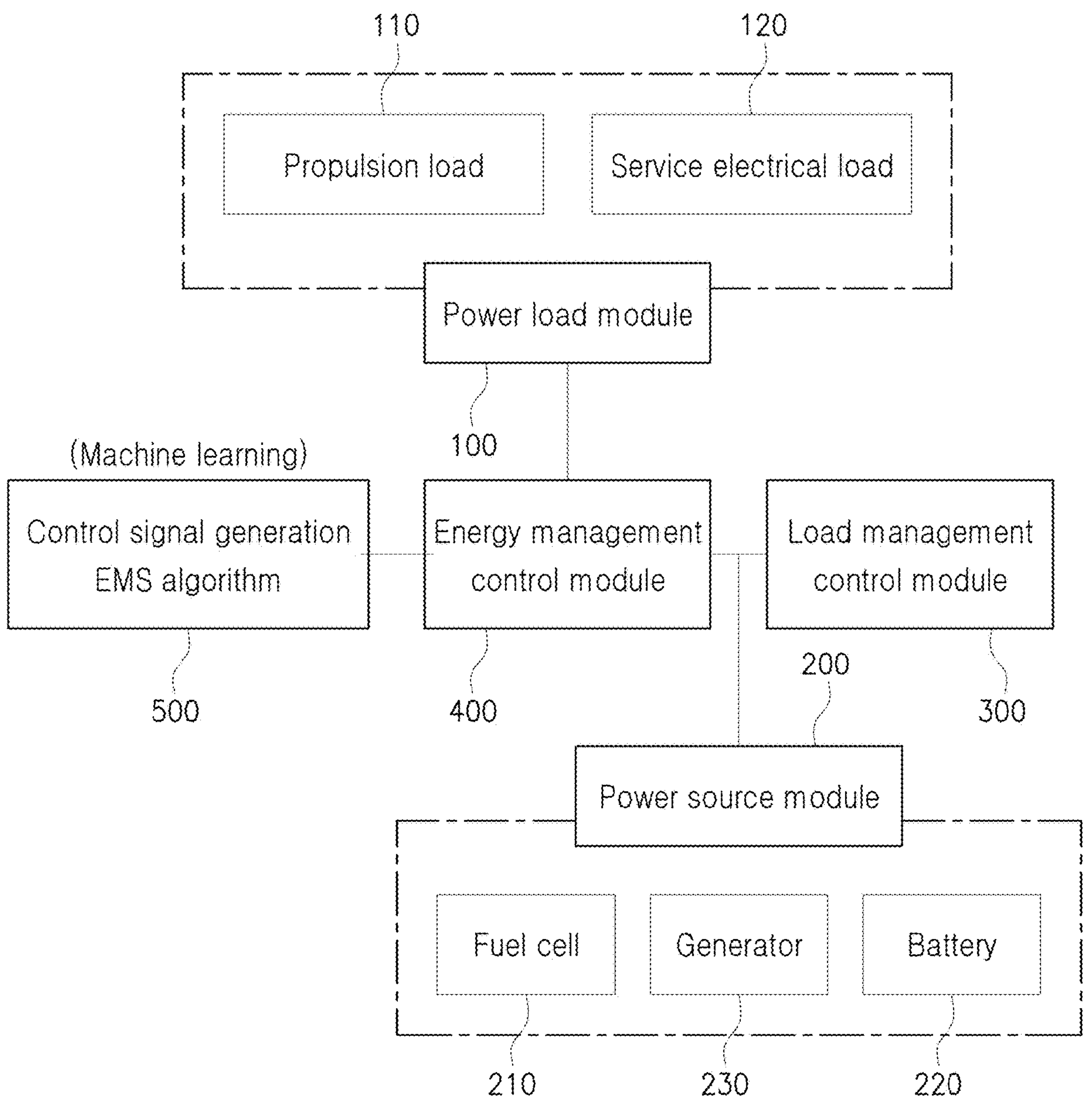
FIG. 1 is a block diagram of the basic configuration of a machine learning-based energy management system according to the present disclosure.

Hereinafter, an embodiment of the present disclosure will be described in detail with reference to the attached drawings. Meanwhile, in the drawings and detailed descriptions, illustrations and references to structures and operations that can be easily understood by those in this field are simplified or omitted. In particular, in the illustrations of the drawings and detailed descriptions, detailed descriptions and illustrations of the specific technical configuration and operation of elements that are not directly related to the technical features of the present disclosure are omitted, and only the technical configurations related to the present disclosure are briefly illustrated or described.

Figure 2:
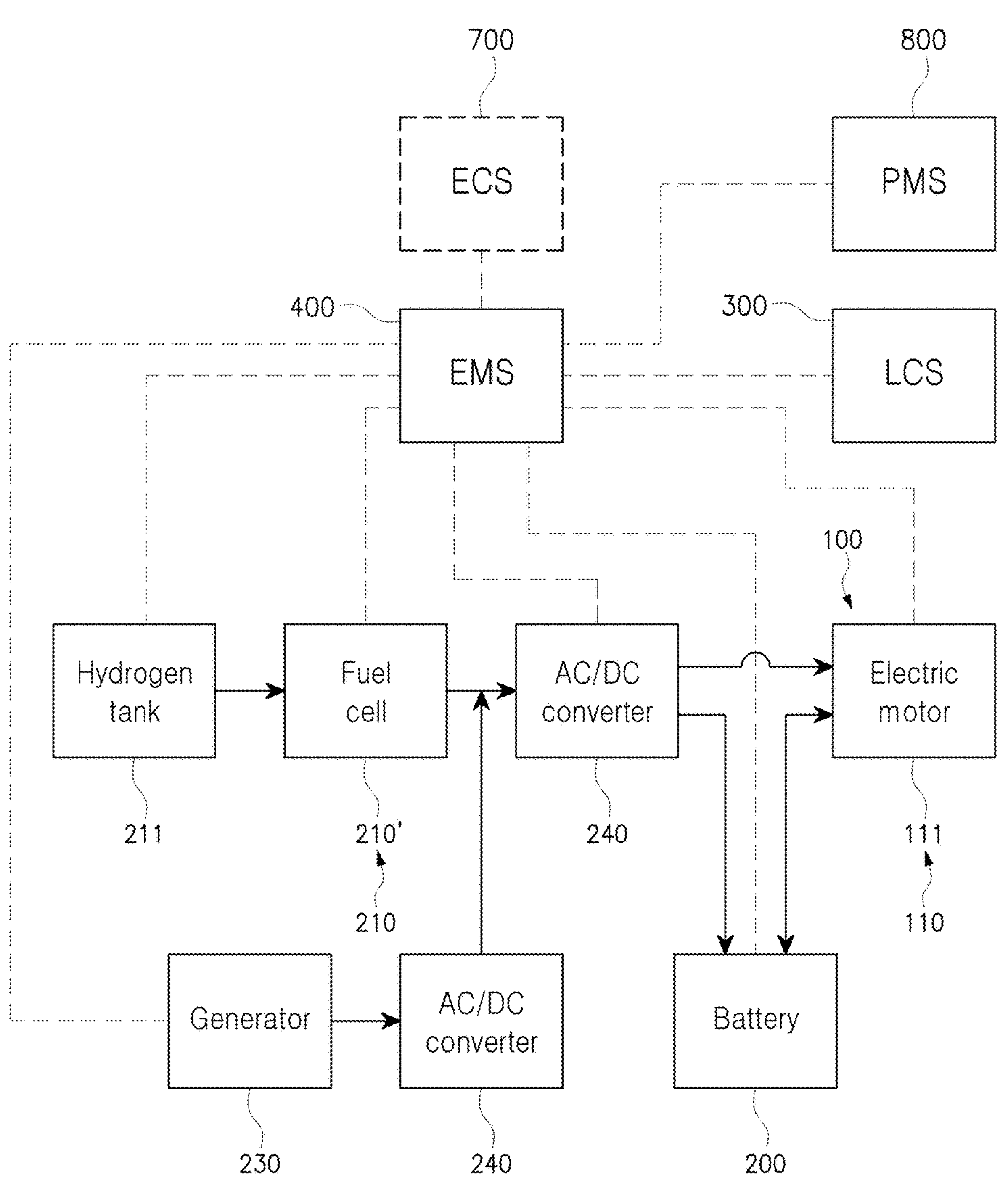
FIG. 2 is a block diagram of the configuration of the machine learning-based energy management system according to an embodiment of the present disclosure.

As illustrated in FIG. 1, a machine learning-based energy management system according to the present disclosure includes a power load module 100, a power source module 200, module 300, and an energy a load management control management control module 400. Particularly, as illustrated in FIG. 2, the machine learning-based energy management system according to an embodiment of the present disclosure is a system that is able to be applied to both a small electric propulsion ship and a large electric propulsion ship that use an electric motor 111 as propulsion power.

The power load module 100 is an element that consumes power supplied from the outside and includes a propulsion load 110 and a service electrical load 120. The propulsion load 110 according to the embodiment of the present disclosure includes the electric motor 111.

The power source module 200 supplies power to the power load module 100, and includes a fuel cell 210, a battery 220, and a generator 230. Here, as illustrated in FIG. 2, the power source module 200 according to the embodiment of the present disclosure is provided with a hydrogen fuel cell 210' connected to a hydrogen tank 211. In addition, the power source module 200 according to the embodiment of the present disclosure is provided with a shaft generator motor (SGM) system as the generator 230, and is provided with the battery 220 charged by being connected to the hydrogen fuel cell 210' and the shaft generator motor system. Meanwhile, the generator 230 of the power source module 200 according to the embodiment of the present disclosure, which is an emergency generator, operates in an emergency situation in which the fuel cell 210 and the battery 220 are not in normal states.

The load management control module 300 implements a load control system (LCS) and is connected to the power source module 200 to perform status monitoring and operation control thereof. The load management control module 300 induces an overall power generation efficiency increase and energy saving while controlling the charging and discharging of the battery 220 according to the load size value of the generator 230.

Figure 3:
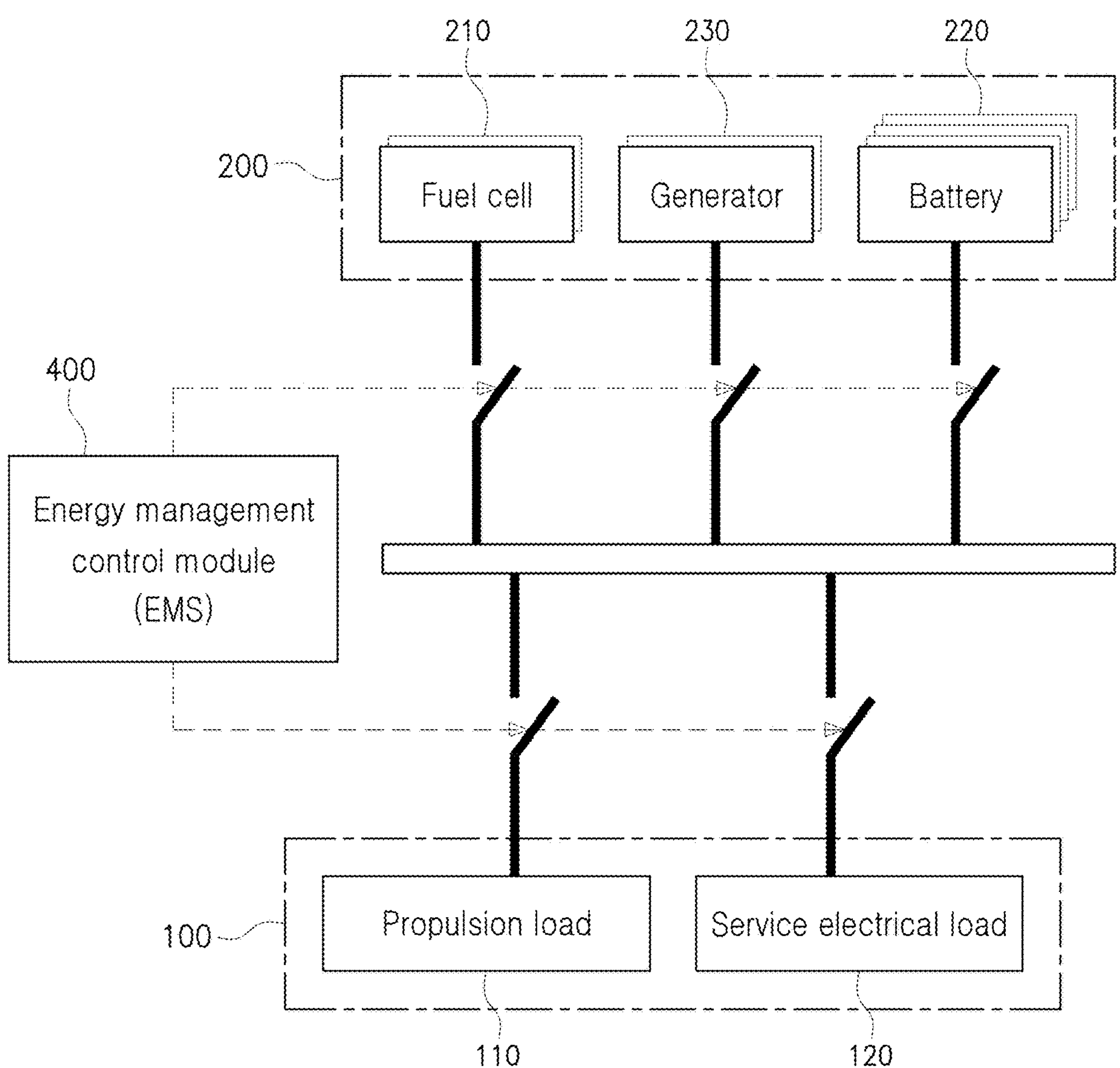
FIG. 3 is a block diagram illustrating the operation structure of an energy management control module according to the present disclosure.

The energy management control module 400, which implements the energy management system (EMS), is connected to the power load module 100 to control power supply to the propulsion load 110 and the service electrical load 120 as illustrated in FIG. 3, and operates in conjunction with the load management control module 300 to control the operation of the power source module 200. Particularly, the energy management control module 400 according to the embodiment of the present disclosure allows the power supply control signal of the power source module 200 corresponding to the required load of the power load module 100 to be calculated in real time by a control signal generation EMS algorithm 500 to which machine learning (ML) is applied. The control signal generation EMS algorithm 500 performs the machine learning of the load data of the power load module 100 and the power data of the power source module 200, and calculates a power supply control signal to increase the output efficiency and energy saving efficiency of the power source module 200 according to the load characteristic, required load, and load change of the power load module 100.

Figure 4:
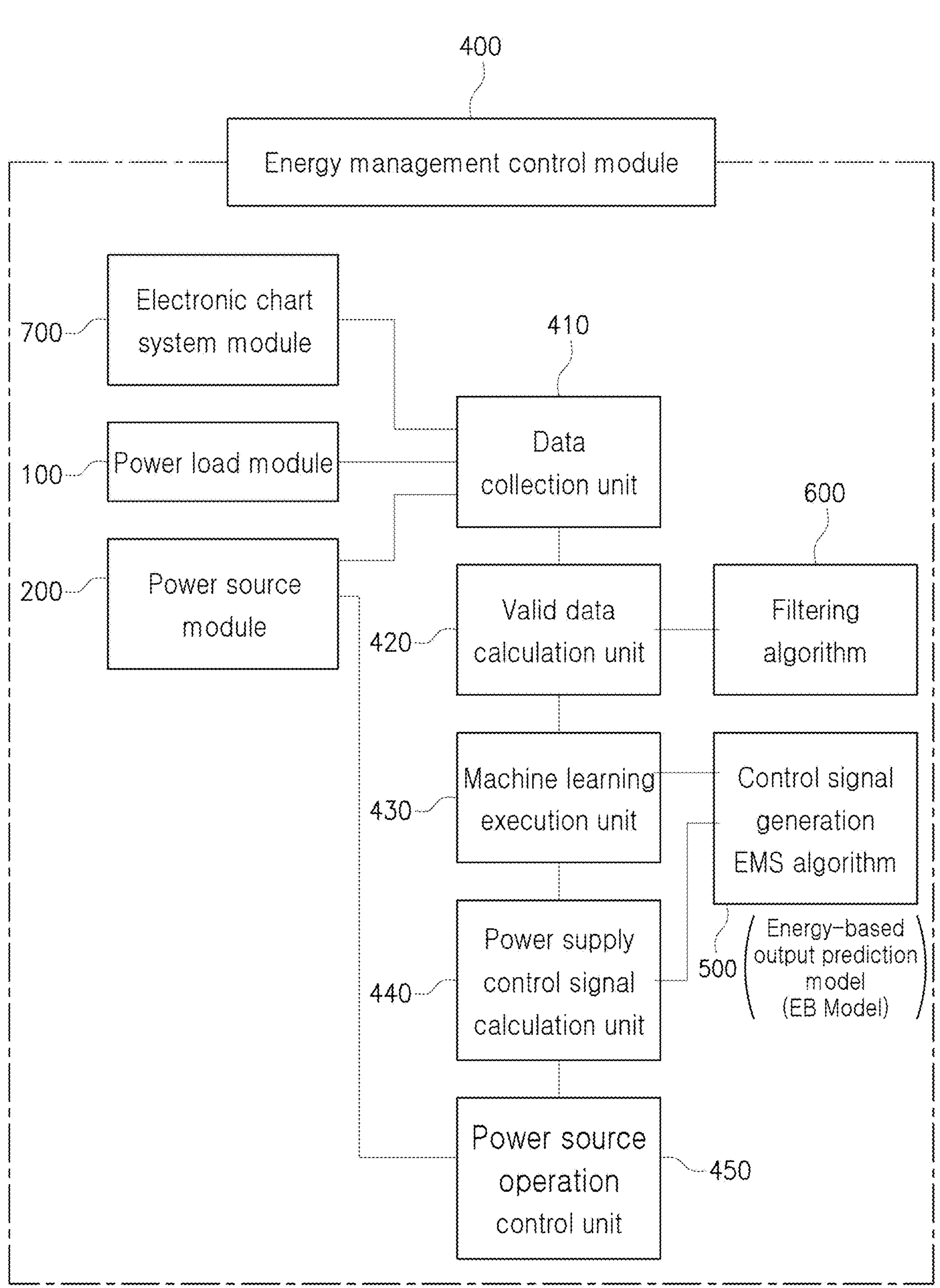
FIG. 4 is a block diagram of the detailed configuration of the energy management control module according to the embodiment of the present disclosure.
Figure 5:
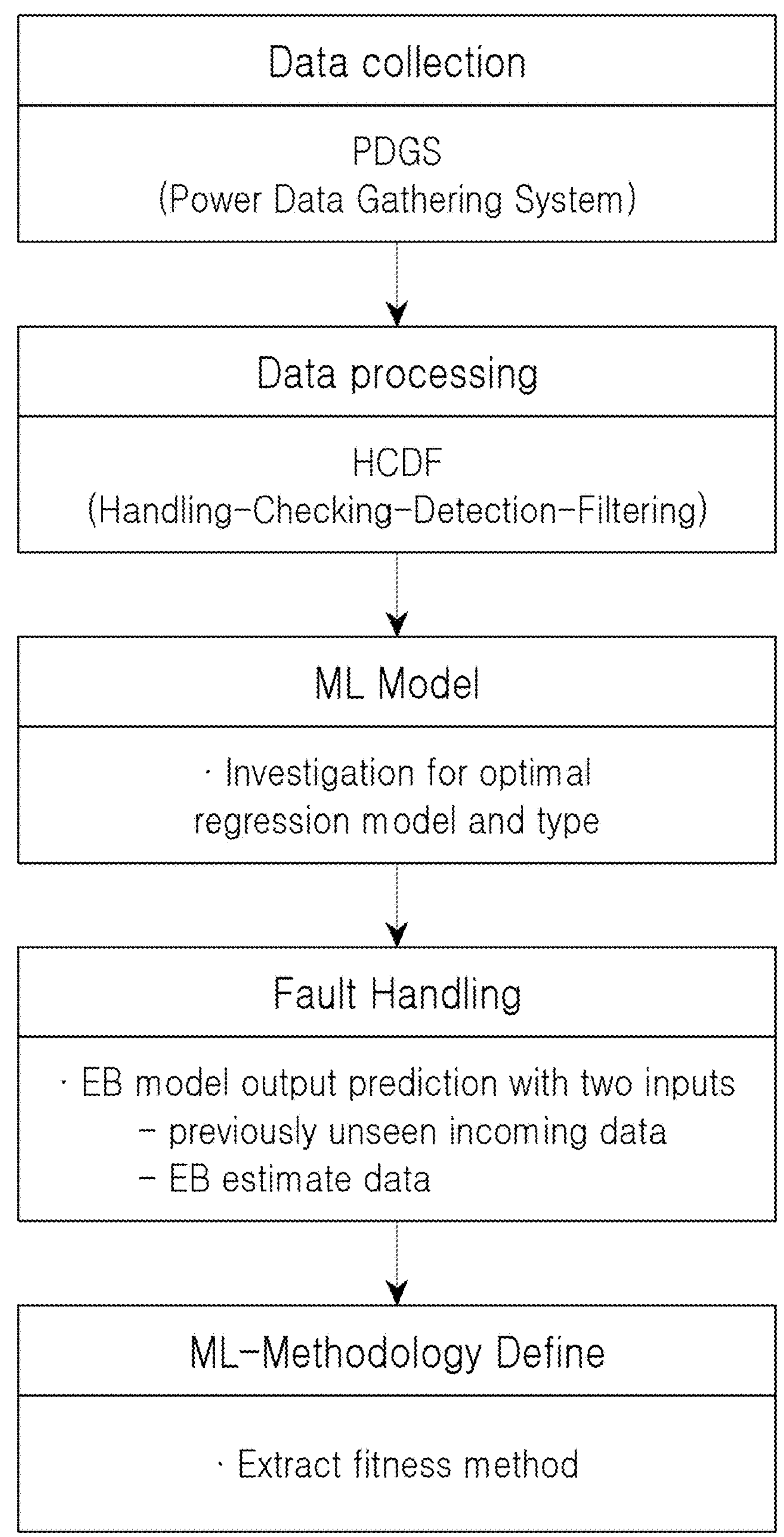
FIG. 5 is a machine learning flowchart of the machine learning-based energy management system according to the embodiment of the present disclosure.

Here, as illustrated in FIGS. 4 and 5, the energy management control module 400 according to the embodiment of the present disclosure includes a data collection unit 410, a valid data calculation unit 420, a machine learning execution unit 430, a power supply control signal calculation unit 440, and a power source operation control unit 450.

The data collection unit 410 is a unit that cumulatively collects initial data for machine learning. To this end, the data collection unit 410 is connected to an electronic chart system (ECS) module 700 to secure ship operation data in real time, and is connected to the power load module 100 and the power source module 200 to secure data in the operation processes of the power load module 100 and the power source module 200 in real time. The initial data for machine learning include the ship operation data, the required load data, actual operation load data, and status information of the power load module 100, and the supply power data and status information of the power source module 200, etc.

The valid data calculation unit 420 is connected to the data collection unit 410 to receive the initial data for machine learning, and is provided with a filtering algorithm 600. The filtering algorithm 600 calculates valid data for machine learning by extracting only initial data for machine learning that fall within a set valid data range region. The filtering algorithm 600 of the valid data calculation unit 420 according to the embodiment of the present disclosure sets a numerical value region between a valid upper data limit (UDL) calculated from [Equation 1] below and a valid lower data limit (LDL) calculated from [Equation 2] below as a valid data range region.

$$UDL = m_0 + Wd\sqrt{\frac{s}{2-s}\left[1-(1-s)^{2k}\right]} \qquad \text{[Equation 1]}$$

-continued $$LDL = m_0 - Wd\sqrt{\frac{s}{2-s}\left[1-(1-s)^{2k}\right]}$$ [Equation 2]

($m_0$: an input data average value, d: a standard deviation, W: a control width, s: a smoothing parameter)

Data outside the valid data range region are determined as defective data, and are prevented from being used for machine learning (ML) in the control signal generation EMS algorithm 500, thereby increasing data reliability, and implementing the control signal generation EMS algorithm 500 with optimal efficiency economic and reliability. Accordingly, when the power source module 200 and the power load module 100 operate in conjunction with each other, it is possible to secure high energy efficiency and operational stability.

The control signal generation EMS algorithm 500 targets the valid data for machine learning between the valid upper data limit (UDL) and the valid lower data limit (LDL) and determines a machine learning method through iterative learning under the following four conditions.

1) A condition in which the output of the power source module 200 is always higher than a load by a predetermined ratio.

2) A condition in which required power is supplied with the output of the power source module 200 increased when there is no spare load of the power source module 200 when a required load is input.

3) A condition in which management is performed on the basis of machine learning by monitoring the output, voltage, and current status of the fuel cell 210 so that the fuel cell 210 may be operated at an optimal output (considering efficiency) between a minimum output and a maximum output in an operation section.

4) A condition in which the operation of the battery 220 is determined by considering the states of the power and load power of the power source module 200, and in this case, management is performed on the basis of machine learning by considering the voltage and remaining capacity (SOC) of the battery 220.

Figure 6:
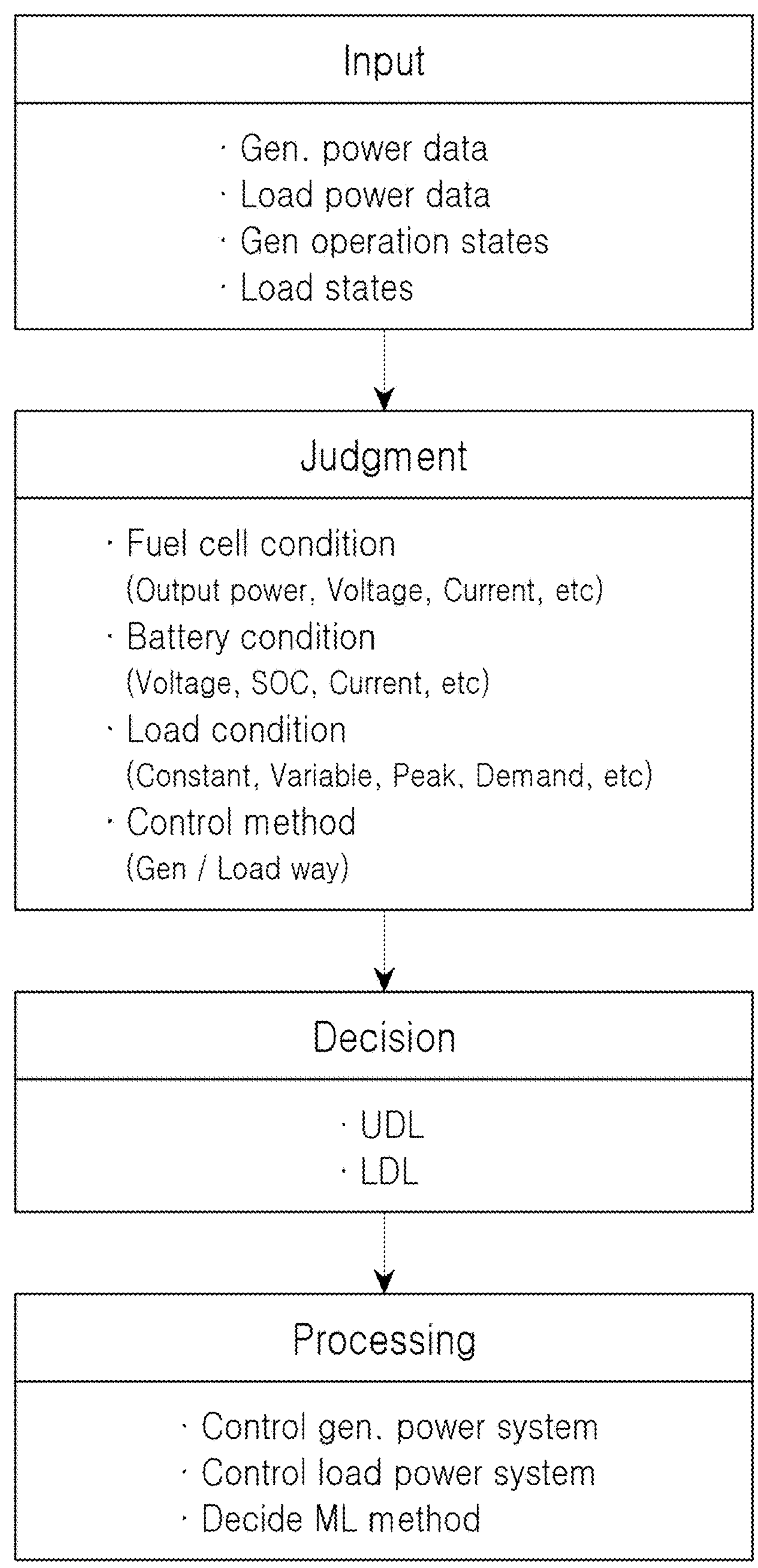
FIG. 6 is an exemplary diagram of a control signal generation EMS algorithm of the machine learning-based energy management system according to the embodiment of the present disclosure.

The machine learning execution unit 430 sets the control signal generation EMS algorithm 500 according to an energy-based output prediction model (EB model) that estimates a power source output to increase the output efficiency and energy saving efficiency of the power source module 200, and, as illustrated in FIG. 6, performs the machine learning of the valid data for machine learning through the control signal generation EMS algorithm 500.

The power supply control signal calculation unit 440 is a unit in which the power supply control signal of the power source module 200 which is actively adjusted to the required load and load change of the power load module 100 which is currently input in real time is calculated in real time by the control signal generation EMS algorithm 500.

Here, the machine learning execution unit 430 and the power supply control signal calculation unit 440 according to the embodiment of the present disclosure perform machine learning by receiving the output value, voltage value, and current value of the fuel cell 210 of the power source module 200, and then calculate a power supply control signal. Through this, the fuel cell 210 is operated at an optimal output value within a range between a minimum output value and a maximum output value.

In addition, the machine learning execution unit 430 and the power supply control signal calculation unit 440 according to the embodiment of the present disclosure perform machine learning by receiving the current value, voltage value, and remaining capacity value of the battery 220 of the power source module 200, and then calculate a power supply control signal. Through this, the operation stability of the power source module 200 is improved. Accordingly, machine learning-based energy management system of the present disclosure considers all the current value, voltage value, and remaining capacity value of the battery 220 so that the output stability of the battery 220 can be secured, thereby increasing the reliability of the management and control of power, unlike the prior art of considering only the remaining capacity value of a battery.

Meanwhile, the voltage of a battery is defined as in [Equation 3] below.

$$V_b = V_{bn} - r_{ir} \cdot i_b$$ [Equation 3]

($V_b$ is the output voltage of a battery, $V_{bn}$ is no-load voltage, $r_{ir}$ is the internal resistance of a battery, and $i_b$ is the current of a battery)

In general, the internal resistance of a battery varies depending on the charging and discharging state of the battery and the current value of the battery, but is assumed to be constant. In addition, generally, the voltage of a battery in an open circuit varies depending on the current, remaining capacity, and hysteresis phenomenon (without considering a temperature) of the battery. An operation model of a battery may be divided into charging and discharging. In the case of charging, the current of the battery is considered to be in a "–" state, and in the case of discharging, the current of the battery is considered to be in a "+" state. Here, the remaining capacity of the battery is expressed as shown in [Equation 4] below.

$$Q_{cd}(t) = Q_{cd}(0) - \int_0^t i_b\,dt$$ [Equation 4]

($Q_{cd}(t)$ is the actual capacity of a battery, $Q_{cd}(0)$ is the initial capacity of a battery, and $Q_{cd}$ is the maximum capacity of a battery)

$C_r$ rate of a battery may be defined as in [Equation 5] below.

$$C_r = i_b/(Q_{cd}/h)$$ [Equation 5]

As described above, the fuel cell 210 is operated in an optimal output state, and status between the power source module 200 and the power load module 100 is managed and controlled in real time by considering the voltage, current, and remaining capacity characteristics of the battery 220, so a power system operates stably and the effective management of the power source module 200 and the power load module 100 is possible.

The power source operation control unit 450 receives a power supply control signal from the power supply control signal calculation unit 440 and controls the operation of the power source module 200.

Meanwhile, the energy management control module 400 may operate in conjunction with a power management control module (PMS) 800 that is previously installed on an electric propulsion ship, and at the manufacturing stage of an electric propulsion ship, the energy management control module 400 may be installed independently without installing the power management control module (PMS) 800.

In the machine learning-based energy management system configured as above according to the embodiment of the present disclosure, the load management control module 300 inducing an overall power generation efficiency increase and energy saving while controlling the charging and discharging 5 of the battery 220 according to the load size value of the generator 230 operates in conjunction with the energy management control module EMS that calculates a power supply control signal based on machine learning to maximize the output efficiency and energy saving efficiency of the power source module 200 so that the power load module 100 and the power source module 200 are managed and controlled, thereby allowing the power source module 200 to operate a required load under an operating condition that maximizes energy efficiency and economic efficiency. Particularly, in the machine learning-based energy management system according to the embodiment of the present disclosure, the power supply control signal of the power source module 200 corresponding to the required load of the power load module 100 is calculated in real time by the control signal generation EMS algorithm 500 to which machine learning (ML) is applied, thereby optimally controlling the power source according to the load characteristics, required load, and load change of the power load module 100, and maximizing output efficiency and energy saving efficiency.

As described above, the machine learning-based energy management system according to the embodiment of the present disclosure is illustrated according to the description and the drawings. However, this is only for an illustrative purpose, and those skilled in the art will be able to understand that various changes and modifications are possible without departing from the technical idea of the present disclosure.

What is claimed is:

1. A machine learning-based energy management system, the system comprising:

a power load module comprising a propulsion load and a service electrical load and configured to consume power supplied from outside;

a power source module comprising a fuel cell, a battery, and a generator and configured to supply power to the power load module;

a load management control module being connected to the power source module to perform status monitoring and operation control thereof, with the load management control module being configured to induce an overall power generation efficiency increase and energy saving while controlling charging and discharging of the battery according to a load size value of the generator; and an energy management control module that is connected to the power load module to control power supply to the propulsion load and the service electrical load, and controls an operation of the power source module in conjunction with the load management control module, wherein the energy management control module allows a power supply control signal of the power source module corresponding to a required load of the power load module to be calculated in real time by a control signal generation energy management system (EMS) algorithm to which machine learning is applied, wherein the control signal generation EMS algorithm performs machine learning of load data of the power load module and power data of the power source module, and calculates the power supply control signal to increase output efficiency and energy saving efficiency of the power source module according to a load characteristic, the required load, and a load change of the power load module, wherein the energy management control module comprises:

a data collection unit being connected to an electronic chart system (ECS) module, the power load module, and the power source module to cumulatively collect initial data for machine learning comprising ship operation data, required load data, actual operation load data, and status information of the power load module, and supply power data and status information of the power source module;

a valid data calculation unit being connected to the data collection unit to receive the initial data for machine learning, wherein the valid data calculation unit calculates valid data for machine learning by extracting only the initial data for machine learning that fall within a valid data range region set through a filtering algorithm, wherein the filtering algorithm of the valid data calculation unit sets a numerical value region between a valid upper data limit (UDL) calculated from Equation 1 and a valid lower data limit (LDL) calculated from Equation 2 as the valid data range region, wherein $$UDL = m_0 + Wd\sqrt{\frac{s}{2-s}\left[1-(1-s)^{2k}\right]}$$

$$LDL = m_0 - Wd\sqrt{\frac{s}{2-s}\left[1-(1-s)^{2k}\right]} \text{ and}$$

$m_0$ is an input data average value, d is a standard deviation, W is a control width, and s is a smoothing parameter.

2. The system of claim 1, wherein the energy management control module further comprises:

a machine learning execution unit configured to set the control signal generation EMS algorithm according to an energy-based output prediction model (EB model) that estimates a power source output to increase the output efficiency and energy saving efficiency of the power source module, and configured to perform machine learning of the valid data for machine learning through the control signal generation EMS algorithm;

a power supply control signal calculation unit in which the power supply control signal of the power source module which is actively adjusted to the required load and load change of the power load module which is currently input in real time is calculated in real time by the control signal generation EMS algorithm; and a power source operation control unit configured to receive the power supply control signal from the power supply control signal calculation unit to control the operation of the power source module.

3. The system of claim 2, wherein the machine learning execution unit and the power supply control signal calculation unit perform machine learning by receiving an output value, a voltage value, and a current value of the fuel cell of the power source module and then calculate the power supply control signal so that the fuel cell operates at an optimal output value within a range between a minimum output value and a maximum output value.

4. The system of claim 2, wherein the machine learning execution unit and the power supply control signal calculation unit perform machine learning by receiving a current value, a voltage value, and a remaining capacity value of the battery of the power source module and then calculate the power supply control signal so that operation stability of the power source module is increased.

5. The system of claim 1, wherein the power source module is provided with the battery charged by being connected to a hydrogen fuel cell and a shaft generator motor (SGM) system provided in an electric propulsion ship.

6. The system of claim 1, wherein the energy management control module operates in conjunction with a power management control module (PMS) previously installed on an electric propulsion ship.

* * * * *